United States Patent Office 3,313,730
Patented Apr. 11, 1967

3,313,730
OLEOPHILIC CLAY POWDER
Gerard P. Caruso, New Orleans, La., assignor to Shell Oil Company, New York, N.Y., a corporation of Delaware
No Drawing. Filed Mar. 30, 1964, Ser. No. 355,940
The portion of the term of the patent subsequent to Oct. 5, 1982, has been disclaimed
12 Claims. (Cl. 252—28)

This application is a continuation-in-part of Ser. No. 245,374, filed Dec. 18, 1962, now abandoned.

This invention is concerned with the production of oleophilic clay products. More particularly, it is concerned with the production of a pulverulent clay product which is readily dispersible in non-aqueous systems.

Oleophilic clays comprise one of two general classes of materials, namely, the so-called onium clays which are chemical reaction products formed between high base exchange clays and onium compounds and clays bearing cationic oleophilic (hydrophobic) surface-active agents which are principally physically adsorbed upon the clay surfaces. The present invention is directed especially to production of clay products of the latter type. Oleophilic clays have found many uses as in the production of thickened lubricants, greases, paints, printing inks, wax compositions, sprays, coatings, polished compositions and the like. One of the problems involved in this area comprises the production of an oleophilic clay which can be manufactured at one geographical location but utilized in another without involving the transportation of non-essential ingredients such as water or oil. The economic desirability of being able to do this is apparent in that many locations throughout the world possess locally produced products which could be modified with an oleophilic clay instead of requiring the shipment of the product to be so modified to the relatively scarce locations where oleophilic clays are produced.

One of the principal problems involved in this field comprises the production of an oleophilic clay product which can be dispersed in its eventual end use compositions, e.g., lubricating oils or greases without the use of complicated equipment and with maximum dispersion of the oleophilic clay in this end use medium. The colloidal nature of clay is such that if not properly treated, the structure of the clay collapses irretrievably and cannot be reexpanded. Thus, the problem is one of preparing a pulverulent product designed to be transported to any desired geographical location and which can be dispersed in its eventual end use medium with desirable expansion of the clay structure so that it can perform its suitable gelling or thickening effect.

Another one of the problems involved in the preparation of compositions comprising an oleophilic clay is the set of conditions required for its dispersal and expansion. In the first place, of course, it is necessary to disperse the clay thoroughly throughout the medium and subject it to sufficient homogenizing so that colloidial particles are formed. In most instances, this is not a mere matter of physical homogenizing but requires the use of heat as well. Provision of the necessary heat is by itself quite expensive in that special equipment, such as jacketed kettles and steam generation facilities, is required in addition to an economical primary source of heat energy. Thus to obtain low cost products such as outlined above, it would be highly desirable to avoid this heating requirement. Moreover, in many geographical locations, a source of heat is either unduly expensive or difficult or impractical to maintain. Consequently, it would be highly desirable not only to produce an oleophilic pulverulent clay product which is re-expandable to its maximum capability in a given medium but also to produce one which can be so dispersed without the use of heat.

Now, in accordance with the present invention, such a product has been found which comprises a dried oil-dispersable clay product passing a 250-mesh screen, which comprises a high basic exchange clay bearing on the surfaces thereof 40–100% by weight, based on the clay, of oleophilic nitrogen compounds selected from the group consisting of imidazolines, amino amides which are formed between certain fatty acids and a mixture of polyethylene polyamines, and mixtures of such imidazolines and amino amides, said pulverulent product having dispersed therethrough 0.1–5.0% by weight of water. It is preferred that hectorite clay be utilized and that the product have dispersed therethrough 0.3–2% by weight of water. When the oleophilic nitrogen compound is an imidazoline, it is preferred that it be one substituted with a long hydrocarbyl chain and be utilized in an amount of about 40–75% by weight of the clay, and, more preferably, in an amount of 55–70%. When the oleophilic nitrogen compound is an amino amide, it is preferred that it be utilized in an amount of 50–125% by weight of the clay and, more preferably, in an amount of 75–100%.

Of particular importance from an economic standpoint is that when mixtures of imidazoline and amino amide are employed, the amount of amino amide on the clay may be reduced to as little as 40% (basis clay) so long as an additional amount of imidazoline equivalent to 20% by weight of the clay is present in the finished grease. The required additional amount of imidazoline may be coated on the clay powder product or it may be added to the lubricating oil base from which the final grease product is formed by mixing into its the pulverulent clay powder of this invention.

Still in accordance with the present invention, a process is provided for the preparation of such a product which comprises forming a hydrosol of the high basic exchange clay, adding thereto 4–12% by weight of phosphoric acid (roughly equivalent to the base exchange capacity of the clay) modifying the mixture with the oleophilic nitrogen compound and drying the mixture so obtained at temperatures between 300 and 1400° F. so as to obtain a product having fine division (must pass 250 mesh) and containing 0.1–5.0% by weight water. The striking feature of the products and particularly of products so produced comprises their ability to be dispersed in their oleophilic end use medium such as lubricating oil by the use of homogenization at ambient temperatures, usually 15–20° C.

The imidazolines which constitute one of two classes of essential hydrophobing agents in the pulverulent compositions of this invention are those substituted with an organic radical of such dimensions as to provide the imidazoline with oleophilic properties. The substituent group or groups may be hydrocarbyl, alkyl, allyl or amino groups of which the following are exemplary:

IMIDAZOLINES

Hydrocarbyl-substituted:
    2-heptadecenyl imidazoline
    2-undecyl imidazoline
    2-octadecyl imidazoline
    2-dodecyl imidazoline
    2-tetradecyl-4,5-dimethyl imidazoline
    4-heptadecenyl imidazoline
    4-octadecyl imidazoline
    4-hexadecyl-2-butyl imidazoline
Alkylol-substituted:
    1-β-hydroxyethyl-2-heptadecenyl imidazoline
    2-β-hydroxyethyl-4-undecyl imidazoline
    4-β-hydroxyethyl-1-heptadecyl imidazoline
    1-β-hydroxybutyl-2-heptadecyl imidazoline
    2α-hydroxyhexyl-4-dodecenyl imidazoline
    1-β-hydroxyethyl-2-undecyl imidazoline
    1-β-hydroxethyl-2-mixed heptadecenyl and heptadecadienyl imidazoline
Amino-substituted:
    1-β-aminoethyl-2-heptadecenyl imidazoline
    2-β-aminoethyl-4-octadecyl imidazoline
    1-triethylene triamino-2-heptadectyl imidazoline
    1-diethylenediamino-2-hexadecyl imidazoline
    1-imidazolino-2-heptadecyl imidazoline It is prefered that the hydrocarbyl substituted imidazolines are those in which the oleophilic radical is one having from 10 to 20 carbon atoms. The imidazolines may be substituted in other positions by other groups which do not directly influence the oleophilic character of the imidazoline to a major extent. The preferred class of hydrocarbyl substituted imidazolines are those in which the long chain hydrocarbyl substitutent is located at the two position, that is, the carbon atom which separates the two nitrogen ring atoms of the imidazoline nucleus.

The alkylol-substituted imidazolines are those in which the alkylol group is one having from about 1 to 20 carbon atoms bearing at least one hydroxyl radical. The preferred class of such materials are those in which the alkylol radical has from 2–6 carbon atoms and 1 hydroxyl radical, the oleophilic character of the imidazoline being supplemented by a long chain hydrocarbyl substituent on another ring carbon atom, preferably in the 2-position. Still more preferred are the imidazolines wherein the alkylol radical is directly attached to the nitrogen atom in the 1 position in the ring.

The amino substituted imidazolines are typified by those in which the amino substituent is an aliphatic, cyclic or mixed cyclic-aliphatic amino group having at least 1 basic nitrogen atom and preferably having at least 2 basic nitrogen atoms which can be primary, secondary or tertiary or any combination of the three.

The amino amides, which constitute the other of the two classes of essential hydrophobing agents in the pulverulent compositions of this invention, are formed between fatty acids having 10–20 carbon atoms per molecule and a mixture of polyethylene polyamines, 20–80% by weight of the mixture comprising 20–80% (but preferably less than 50%) of diethylene triamine, the remaining fraction being polyethylene polyamines having an average molecular weight within the range 220–450, the amino amides having been formed between 30–75% by weight polyamines and 70–25% by weight of fatty acids by heating at 200–225° C. for a reaction period of 1–4 hours.

Both saturated and unsaturated fatty acids and mixtures thereof may be used in the amino amide. However, a different range of molecular weights for the fatty acids are preferred, depending on whether they are predominantly saturated or unsaturated.

When at least 50% by weight of the fatty acids contain at least 1 double bond per molecule, it is preferred to use $C_{16-20}$ fatty acids. On the other hand, when predominately saturated fatty acids are used, i.e., those acids having an iodine value of 50 or below, it is preferred to use $C_{10-18}$ fatty acids.

Though essentially completely saturated or unsaturated acids can be used within the foregoing carbon number limitations, it will normally be preferred to use mixtures of fatty acids both as to unsaturation and carbon number since they are considerably less expensive and no less effective.

It has been found, however, that the ratio of polyamines to fatty acid in the amido amine is significant with regard to grease yield, i.e., the gelling capacity of the clay product. In particular, it is preferred that the amine/acid ratio be from about 30/70 to about 40/60 and still more preferably from about 30/70 to about 35/65.

The clays to be used in the process of the invention are those having a substantial base exchange capacity, preferably between about 60 and 100 milliequivalents of exchangeable base per 100 grams of clay. These include particularly the montmorillonites, especially the sodium, potassium, lithium and other bentonites such as Wyoming bentonite, magensium bentonite (hectorite) and saponite. The clays are preferably treated especially if it is contemplated that their end use will be in lubricating compositions such as greases, to remove the substantial amount of gangue which is normally associated therewith. This can be done by dispersal of the crude clay in water and allowing the product to separate into fractions which may be separated from one another either by gravitational means or more preferably by high-speed centrifuging. The clay forms a hydrous sol with water, a preferred concentration being 1–5% by weight of clay in order to have a system which is relatively fluid and easy to transport such as by pumping and the like.

In order to prepare the clay in suitable manner for full reception of the oleophilic nitrogen compound, the clay while in hydrosol form should be treated with a mineral acid, preferably a phosphorus acid such as phosphoric acid in an amount approximately equal to the basic exchange capacity of the clay. When utilizing the phosphoric acid, this will ordinarily be in an amount between about 4 and about 12% by weight based on the clay.

Subsequent to the acidification of the clay hydrosol as described above, the subject classes of oleophilic nitrogen compounds are added preferably under such conditions that the compound is in a liquid state.

The important feature of the present invention comprises not only the choice of the two particular classes of nitrogen compounds but also in the use of a critically limited proportion thereof relative to the clay weight. The resctricted proportion of imidazoline and/or amino amide is one of substantial economic significance as well as technical importance. For, in an effort to produce a powdered oleophilic product, many other hydrophobic amines and nitrogenous materials were tested and found to provide satisfactory water-resistant properties and capability of the powder to be dispersed in oil but only if additional materials weer employed as agents for dispersion or if substantially greater quantities of amine were utilized. The imidazolines and the amino amides, such as a class as defined herein, appear to be unique in imparting the recited functions to be oleophilic clay products, mainly, of ready dispersability in oil, lack of necessity for utilizing heat in this redispersal process, and finally accomplishing these end results without the use of excessive and expensive water-proofants. Though supplemental water-proofants and surfactive agents may be employed in the practice of the invention, their use is not required, and is to be avoided on economic grounds, within the following quite critical limits of applicant's invention.

| Hydrophobing Agent | Broad Range, Percent | Optimum Range, Percent |
|---|---|---|
| Imidazoline | 50–125 | 55–70 |
| Amino Amide | 60–125 | 75–100 |
| Combination of Imidazoline and Amino Amide | (1) | (1) |

[1] 40–60% amino amide, and not more than 35% imidazoline.

As will be seen by the working examples which follow, when both classes of hydrophobing agent are employed, the imidazoline need not be adsorbed on the clay, but may be added to the lubricating oil base stock to which the clay powder is added and commingled to form a finished grease product. More generally, it has also been found that whenever the amount of oleophilic nitrogen compound on the clay is at least 60%, basis weight of the clay, any additional amount, which might be desired to obtain the desired properties, can be added to the lubricating base oil instead of the clay. It will be recognized that this degre of freedom is important in the commercial practice of this invention where it is desired to manufacture a single "standard" clay powder. By so doing, a greater variety of end use requirements may be met.

The proportion of water in the products, namely, 0.1–5.0% by weight, appears to perform the purpose of improving the composition in which the oleophilic clay is eventually dispersed. This is particularly noticeable in the mechanical stability of compositions such as greases wherein relatively poor mechanical stability is sometimes experienced if no water is present. It is especially noteworthy, however, that the proportion of water employed in the clay powder is sufficient for the purpose of improving properties such as mechanical grease properties but is of so small a proportion that it does not add unduly to the cost of transporting the powdered product to a utilization location.

The oleophilic clay powders of this invention must be finely divided (preferably pass a 250-mesh screen) and must contain from 0.1 to 5.0% by weight water. Within these quite critical limits for the dried product, the method of drying the oleophilic clay powder may also be quite critical in that (1) the time and temperature of drying must not be so high as to decompose the organic components of the powder; and (2) the drying and degree of particle dispersion during drying must be such that the interstices as well as the surface of the dried powder are open and thus available for contacting the lubricating base oil to which they are added. Thus any drying cycle which causes agglomeration and surface-hardening of the resultant clay powder is unsatisfactory. Though drum dryers and tray dryers have been used successfully, the use of spray drying has been found to be uniquely advantageous in preparing the oleophilic clay powders of the invention.

Any of the three common atomization means used in spray-drying may be used, i.e., two-fluid nozzles, pressure nozzles, and centrifugal disks or cones, but pressure nozzles and centrifugal disk or cone-type nozzles are preferred since the operating variables thereof may be varied sufficiently to atomize slurries having a comparatively wide viscosity range to the required degree of fineness.

Previous attempts have been made to employ spray drying for the preparation of oleophilic clay powders, but this has only been successful when utilizing a substantial proportion of oil in the product and when restricting the temperatures of operation to a relatively low level. Contrary to these findings, it has now been discovered that the best results are obtained for the production of the present products by the virtual omission of oil therefrom and by the utilization of drying temperatures in the order of 300–1400° F. during the drying process. Temperatures between about 500 and 1050° F. are particularly preferred when drying the oleophilic clay powder. The upper limit is a preferred maximum whenever the powder is exposed to the drying temperature for prolonged periods. The lower limit respresents the temperature above which the tendency to agglomerate is reduced when methods other than spray drying are employed. Under these conditions, the products have all of the properties desired in an oleophilic clay as considered herein above, namely, the ability to be dispersed in an oleophilic medium such as lubricating oil without the aid of heat and merely by employing an homogenizing device.

The pulverulent oleophilic clay powders produced as described above are useful for a number of purposes such as components for paper coatings, fillers and reinforcing agents for natural and synthetic rubbers, ingredients of sizing compositions for fibrous materials, bonding agents for paints, lacquers and inks, thickeners for oil base drilling muds as well as lubricating oils and particularly for the preparation of grease compositions.

The preparation of the grease compositions best illustrates the advantages gained by the use of the pulverulent products of this invention.

The greases contemplated usually comprise a major proportion of a lubricating oil together with a minor amount sufficient to form a grease structure therein of the clay product described hereinbefore. However, small additional amounts of water may also be incorporated therein for the purpose of improving yield and milling characteristics. Mineral lubricating oils are preferred for this purpose but synthetic lubricants such as the oleaginous esters of aliphatic dibasic acids and $C_{4-12}$ monohydric alcohols as well as the complex esters formed between polyhydric alcohols and polybasic acids may be employed in addition to the polymeric ethers such as polyethylene oxide or polypropylene glycol polymers. Pentaerythritol esters are suitable for this purpose as well as their polyphenyl ethers. Certain phosphorus esters having oleaginous properties such as trialkyl phosphate and tricresyl phosphate may be employed in place of or in addition to other lubricants. Since the powdered products of this invention are so easily dispersed in lubricating oils without the aid of heat, it will be evident that relatively simple equipment is required for this purpose. This normally will comprise a multiple roll mill or a homogenizing device such as those commonly employed in the grease industry. Since no volatile solvents or excess waters are involved in this process, no recovery problems of such materials need be considered here.

The following examples illustrate the process and products of this invention.

*Example I*

Crude hectorite clay was dispersed in water and subjected to centrifuging to remove the gangue therefrom, leaving a clay hydrosol containing about 1.5 to 3.5% by weight of clay. This was acidified with 8% phosphoric acid based on the dry clay weight. The hydrosol was then mixed with 60% by weight based on the clay of 2-heptadecyl imidazoline, and 12.5% $NaNO_2$ based on the clay weight was added thereto as a corrosion inhibitor. The mixture was subjected to spray drying in a spinning cone drier operated at about 40,000 r.p.m., the inlet temperature being about 340–350° C. and the outlet temperature being about 140–150° C. Under these conditions, the product obtained passed a 250-mesh screen and contained about 2.0% of water.

The oleophilic clay powder so produced was blended with a mineral lubricating oil having a viscosity of 75 Saybolt Universal seconds at 210° F., the blend being passed through a Gaulin homogenizer at 5000 pounds p.s.i.g. to give a grease having an unworked penetration of 238 and a worked penetration of 239. The grease had an ash content of 5.87% and a water content of 0.13%.

Example II

The same procedure as in Example I was followed except that 75%, basis dry weight of an amino amide formed between tall oil acids and polyethylene polyamine, was utilized as the hydrophobing agent. The resultant grease had an unworked penetration of 256 and a worked penetration of 262. The grease also contained 6.19% wt. ash and 0.19% wt. water.

Example III

When the same procedure as Example I was followed using only 60% of the amino amide, the resultant product, after only one pass through the Gaulin homogenizer was semi-fluid. However, upon being passed through the homogenizer a second time, the resultant product was thickened to an unworked penetration of 360. This product was then passed through the Gaulin homogenizer a third time, whereupon an unworked penetration of 326 and a worked penetration of 352 were obtained. The grease contained 5.89% ash and 0.25% water. The higher penetrations obtained with the 60% by weight amino amide on the clay indicate that this is approximately the lower limit at which satisfactory greases may be obtained using amino amides alone as the hydrophobing agent.

Example IV

Oleophilic clay powder produced in the manner of Example I but containing only 40%, basic clay weight, of amino amide was blended with a mineral lubricating oil having a viscosity of 75 SUS at 210° F. in which was contained an amount of imidazoline equivalent to 20% of the weight of the clay, and the blend was passed through a Gaulin homogenizer at 5,000 p.s.i.g. The resultant grease had an unworked penetration of 306 and a worked penetration of 284. Ash content was 5.82% and the water content was 0.18%. The properties of the grease obtained show that as little at 40% amino amide can be used on the clay alone if an additional amount of imidazoline equivalent to 20% by weight of the clay is present in the finished grease.

Example V

Two samples of oleophilic clay powder were prepared in the manner of Example I and coated with 60% wt. (basis clay) of amino amide. Separate quantities of this powder were then blended separately into two samples of mineral lubricating oil containing an amount of imidazoline equivalent to 11% and 7%, basis weight of the clay. The blends were each passed through a Gaulin homogenizer at 5,000 p.s.i.g. The grease thus formed from the oil containing 11% imidazoline was found to have an unworked penetration of 340. The thus homogenized product from the oil containing only 7% of the imidazoline was semi-fluid. When each was again passed through the homogenizer, the grease from the 11% imidazoline-containing oil had an unworked peneration of 294 and a worked penetration of 300. The grease formed from the oil containing only 7% imidazoline had an unworked penetration of only 332. It therefore appears that at least about 10% of imidazoline must be used in the lubricating base oil if substantial improvement in grease properties are to be obtained by this method for greases prepared from the 60% wt. amino amide clay powder.

Example VI

Two samples of oleophilic clay powder were prepared in the manner of Example I, one of which contained 60% wt. amino amide, the other containing 75% wt. amino amide. Using the above described lubricating oil base stock, the 75% amino amide clay was added to the oil, blended therewith, and passed through a Gaulin homogenizer at 5,000 p.s.i.g. A grease having an unworked penetration of 256 was obtained. The 60% amino amide clay was then added to a separate sample of the same oil, to which had been added an amount of amino amide equivalent to 15% by weight of the clay, blended therewith, and passed through a Gaulin homogenizer at 5,000 p.s.i.g. A grease having an unworked penetration of 365 was obtained. Upon passage through the homogenizer a second time, the unworked penetration was lowered to 298.

Example VII

Two samples of oleophilic clay powder were prepared in the manner of Example I, one of which contained 60% wt. imidazoline, the other 75% wt. imidazoline. The clay containing 75% wt. of imidazoline was then added to a mineral lubricating oil base stock, blended, and milled in a homogenizer at 5,000 p.s.i.g. A grease having unworked and worked penetrations of 269 and 259 respectively was obtained. The 60% wt. imidazoline containing clay was then added to a separate sample of the same oil to which had been added an amount of imidazoline equivalent to 15% by weight of the clay, blended, and milled at the same pressure. A grease having an unworked and worked penetration of 244 and 250 respectively was obtained.

From these data, it is evident that not all hydrophobing mixture need be deposited on the clay powder. When a single hydrophobing agent is employed, as in the foregoing example, the effectiveness of a given amount of the agent is greater if it is all precoated on the clay. In any event, the amount of hydrophobing agent which is added via the oil should be less than the amount which is coated on the clay. However, when using a mixture of amino amide and imidazoline in accordance with the invention, it is preferred that whichever water proofant is used in the greater amount alone be coated on the clay, and that the additional surfactant be incorporated into the grease product via the lubricating oil.

In each of the foregoing examples, preparation of the grease by blending the clay with the lubricating oil base stock was done without heating and at room temperature, which at the time of the tests was about 80° F. Though higher temperatures can be used, they are, of course, unnecessary. It will be recognized by those skilled in the art that the addition of sodium nitrite was solely for the enhancement of the anti-corrosion properties of the final grease product and is therefore not a strict necessity from the standpoint of the capability of the oleophilic powder to function as gelling agent.

Example VIII

Two oleophilic clay powders were prepared in the manner of Example I except that instead of using an imidazoline as the initial waterproofant, two amino amides of different amine/acid ratio were employed. Each of these powders was blended into a mineral lubricating containing an amount of 1-hydroxyethyl-2-mixed-heptadecenyl, heptadecadienyl imidazoline equivalent to 10% by weight of the clay, and a small amount of water added to this blend.

The blends were each passed through a Gaulin homogenizer at 5000 p.s.i.g. The composition and properties of the two greases were as follows:

TABLE I.—EFFECT OF AMINE/ACID RATIO

| | | |
|---|---|---|
| Amine/Acid Ratio, by wt | 40/60 | 35/65 |
| Clay Powder, Percent wt | 10 | 10 |
| Added Imidazoline, Percent wt | 1.0 | 1.0 |
| Added Water | 0.4 | 0.4 |
| Penetration after One-Pass through Homogenizer, dmm.: | | |
| Unworked | 313 | 269 |
| Worked | 321 | 276 |

The above data show that significantly greater clay-gelling capacity is achieved when the ratio of amine to fatty acids in the coating of the clay is below 40/60. For this reason it is preferred to use amino amides in which the ratio of amine to fatty acids is from about 30/70 to about 35/65.

It will, of course, be recognized that in each of the foregoing examples where the properties of two or more greases are being compared, each of the comparative samples contained essentially the same relative amount of clay.

Supplemental wetting agents may be added to the lubricative oil base stocks used to make greases from the oleophilic clay powder, which is the subject of the invention. Though they are not necessary when the invention is practiced as described herein, their use in some instances may substantially improve the processibility of the oleophilic clay powders of the invention into a finished grease. In particular they have been found to reduce substantially the milling requirements to obtain a grease of given penetration from the clay-thickening agents of the invention.

One particularly good class of materials for this purpose is certain normally solid high-molecular-weight (>500) polyethylene glycols which are sold under the trade name of Carbowax(es).

The substantial processing advantage of using Carbowax in the lubricating oil to which the oleophilic clay powders of the invention are added in grease manufacture is shown by the following example:

*Example IX*

A series of several greases was formulated from oleophilic clay powder which had been made in accordance with Example II. Separate quantities of the powder were blended into mineral lubricating oil, to which had been added varying quantities of imidazoline and Carbowax. Upon the further addition of a small amount of water to the blend, each blend was passed twice through a Gaulin homogenizer. The worked and unworked penetration of the milled grease were determined after each pass. The following data from this test show that the addition of Carbowax in amounts as low as 0.05% by weight of the total grease significanly improves the grease yield or alternatively the degree of milling necessary to get a satisfactory grease structure of given hardness.

TABLE II.—EFFECT OF CARBOWAX ADDITION

| | | | | | | | | | |
|---|---|---|---|---|---|---|---|---|---|
| Added Imidazoline,[1] percent wt | 0.8 | 0.8 | 0.8 | 0.9 | 0.9 | 0.9 | 1.0 | 1.0 | 1.0 |
| Added Carbowax,[2] percent wt | None | 0.1 | 0.125 | None | 0.1 | 0.125 | None | 0.05 | 0.125 |
| Grease Penetration after One Pass, dmm.: | | | | | | | | | |
|   Unworked | 298 | 260 | 297 | 303 | 266 | 272 | 307 | 265 | 279 |
|   Worked | | 271 | | 308 | 269 | | | 275 | 288 |
| Grease Penetration after Two Passes, dmm.: | | | | | | | | | |
|   Unworked | 281 | | 282 | | | 275 | 283 | 293 | |
|   Worked | 285 | | 287 | | | 284 | 308 | 290 | |

[1] 1-hydroxyethyl-2-mixed heptadecenyl and heptadecadienyl imidazolines.
[2] Carbowax 1500 having the following properties:
    Density, g./cc. at 20° C _____ 1.151
    Melting range, ° C _____ 34–37
    Viscosity range, SSU at 210° F., sec __ 60–90
    Flash point, COC, ° F _____ 430
    Solubility in $H_2O$ at 44° C., percent wt __ 100

Carbowaxes having average molecular weights of from 500–600 are preferred, though molecular weights up to as high as 1600 may be employed.

The temperature at which the semi-fluid blend of clay and oil is fed to the homogenizer will ordinarily be within the range of from about 60 to 190° F. and usually room temperature. However, it will be recognized that the energy of mixing imparted to the grease during homogenization may raise the temperature of the grease to as high as 140 to 230° F. Homogenization temperatures of 100–190 have been found to give superior grease stability when using the clay powders of the invention.

I claim as my invention:

1. A pulverulent spray-dried oil-dispersible clay product passing a 250-mesh screen comprising a high base exchange clay which has been acidified with a mineral acid bearing on the surfaces thereof 40–125% by weight, based on the clay, of an oleophilic nitrogen compound selected from the group consisting of imidazolines substituted with from 1 to 2 radicals selected from the group consisting of hydrocarbyl, alkylol and amino radicals, amino amides formed between fatty acids and mixtures of polyethylene amines, and mixtures thereof, said pulverulent product having dispersed therethrough 0.1–5.0% by weight of water.

2. A pulverulent spray-dried oil-dispersible clay product passing a 250-mesh screen comprising hectorite clay which has been acidified with a mineral acid bearing on the surface thereof 40–75% by weight, based on the clay, of an oleophilic imidazoline substituted with from 1 to 2 radicals selected from the group consisting of hydrocarbyl, alkylol and amino radicals, said pulverulent product having dispersed therethrough 0.1–5.0% by weight of water.

3. A pulverulent spray-dried oil-dispersible clay product passing a 250-mesh screen comprising hectorite clay which has been acidified with phosphoric acid bearing on the surface thereof 50–75% by weight, based on the clay, of heptadecenyl imidazoline, said pulverulent product having dispersed therethrough 0.1–5.0% by weight of water.

4. A pulverulent spray-dried oil-dispersible clay product passing a 250-mesh screen comprising a high base exchange clay which has been acidified with a mineral acid bearing on the surfaces thereof 40–100% by weight, based on the clay, of an amino amide formed between $C_{10-20}$ fatty acids and mixtures of polyethylene amines, the amine/acid ratio of the amino amide being from about 30/70 to about 40/60, said pulverulent product having dispersed therethrough 0.1–5.0% by weight of water.

5. A pulverulent spray-dried oil-dispersible clay product passing a 250-mesh screen comprising a high base exchange clay which has been acidified with a mineral acid bearing on the surfaces thereof 40–100% by weight, based on the clay, of an amino amide formed between $C_{10-20}$ fatty acids and mixtures of polyethylene amines, the amine/acid ratio of the amine amide being from about 30/70 to about 35/65, said pulverulent product having dispersed therethrough 0.1–5.0% by weight of water.

6. A pulverulent spray-dried oil-dispersible clay product passing a 250-mesh screen comprising hectorite clay which has been acidified with phosphoric acid bearing on the surface thereof 50–100% by weight, based on the clay, of amino amides formed between fatty acids having 16–20 carbon atoms per molecule, at least 50% by weight of the fatty acids containing at least one double bond per molecule and a mixture of polyethylene polyamines, 20–80% by weight of the mixture comprising diethylene triamine, the remaining fraction being polyethylene polyamines having an average molecular weight within the range 250–400 obtained as a bottoms product in the preparation of ethylene diamine, said amino amides having been formed by heating the fatty acids with the polyamines at a temperature between 200 and 225° C. for a reaction time of 1–4 hours, said pulverulent product having dispersed therethrough 0.1–5.0% by weight of water.

7. A pulverulent spray-dried oil-dispersible clay product passing a 250-mesh screen comprising a high base exchange clay which has been acidified with phosphoric acid bearing on the surface thereof 40–100% by weight, based on the clay, of an amino amide formed between predominately saturated fatty acids having 10–18 carbon atoms per molecule and an Iodine Value of below 50, and a mixture of polyethylene polyamines, 20–80% by weight of the mixture comprising diethylene triamine, the remaining fraction being polyethylene polyamines having an average molecular weight within the range 250–400 obtained as a bottoms product in the preparation of ethylene diamine, said amino amides having been formed by heating the fatty acids with the polyamines at a temperature between 200 and 225° C. for a reaction time of 1–4 hours, said pulverulent product having dispersed therethrough 0.1–5.0% by weight of water.

8. A pulverulent spray-dried oil-dispersible clay product passing a 250-mesh screen comprising hectorite clay which has been acidified with phosphoric acid bearing on the surface thereof 60–75% by weight, based on the clay, of a mixture of oleophilic nitrogen compounds consisting essentially of between 40–60% by weight, based on the clay, of amino amides formed between fatty acids having 10–20 carbon atoms per molecule and a mixture of polyethylene polyamines, 20–80% by weight of the mixture comprising diethylene triamine, the remaining fraction being polyethylene polyamines having an average molecular weight within the range 250–400 obtained as a bottoms product in the preparation of ethylene diamine, said amino amides having been formed by heating the fatty acids with the polyamines at a temperature between 200 and 225° C. for a reaction time of 1–4 hours, and from 35–10% by weight, based on the clay, of an oleophilic imidazoline substituted with from 1 to 2 radicals selected from the group consisting of hydrocarbyl, alkylol and amino radicals, said pulverulent product having dispersed therethrough 0.1–5.0% by weight of water.

9. A pulverulent spray-dried oil-dispersible clay product passing a 250-mesh screen comprising hectorite clay which has been acidified with phosphoric acid bearing on the surface thereof 60–75% by weight, based on the clay, of a mixture of oleophilic nitrogen compounds consisting essentially of between 40–60% by weight, based on the clay, of amino amides formed between fatty acids having 16–20 carbon atoms per molecule, at least 50% by weight of the fatty acids containing at least one double bond per molecule and a mixture of polyethylene polyamines, 20–80% by weight of the mixture comprising diethylene triamine, the remaining fraction being polyethylene polyamines having an average molecular weight within the range 250–400 obtained as a bottoms product in the preparation of ethylene diamine, said amino amides having been formed by heating the fatty acids with the polyamines at a temperature between 200 and 225° C. for a reaction time of 1–4 hours, and from 35–10% by weight, based on the clay, of an oleophilic imidazoline substituted with from 1 to 2 radicals selected from the group consisting of hydrocarbyl, alkylol and amino radicals, said pulverulent product having dispersed therethrough 0.1–5.0% by weight of water.

10. A pulverulent spray-dried oil-dispersible clay product passing a 250-mesh screen comprising hectorite clay which has been acidified with phosphoric acid bearing on the surface thereof 60–75% by weight, based on the clay, of a mixture of oleophilic nitrogen compounds consisting essentially of between 40–60% by weight, based on the clay, of amino amides formed between predominantly saturated fatty acids having 10–18 carbon atoms per molecule and an Iodine Value of below 50, and a mixture of polyethylene polyamines, 20–80% by weight of the mixture comprising diethylene triamine, the remaining fraction being polyethylene polyamines having an average molecular weight within the range 250–400 obtained as a bottoms product in the preparation of ethylene diamine, said amino amides having been formed by heating the fatty acids with the polyamines at a temperature between 200 and 225° C. for a reaction time of 1–4 hours, and from 35–10% by weight, based on the clay, of an oleophilic imidazoline substituted with from 1 to 2 radicals selected from the group consisting of hydrocarbyl, alkylol and amino radicals, said pulverulent product having dispersed therethrough 0.1–5.0% by weight of water.

11. The process for the production of a pulverulent clay product which comprises:
  (a) forming a hydrosol containing 1–5% by weight of a high base exchange clay;
  (b) adding 4–12% by weight of phosphoric acid;
  (c) adding thereto from 40–125% by weight of an oleophilic nitrogen compound selected from the group consisting of imidazolines substituted with from 1 to 2 radicals selected from the group consisting of hydrocarbyl, alkylol and amino radicals, amino amides formed between fatty acids and mixtures of polyethylene amines, and mixtures thereof; and
  (d) drying the mixture so obtained at a temperature of from 300–1400° F. whereby a product passing a 250-mesh screen is produced having a free moisture content of 0.1–5.0% by weight.

12. The process for the production of a grease composition which comprises subjecting a minor grease-forming proportion of the clay product of claim 1 and a lubricating oil containing an oleophilic nitrogen compound selected from the group consisting of imidazolines substituted with from 1 to 2 radicals selected from the group consisting of hydrocarbyl, alkylol and amino radicals and amino amides formed between fatty acids and mixtures of polyethylene amines, in an amount equivalent to at least 10% but less than 100% by weight of the clay contained in the clay product to homogenizing at temperatures of 60–190° F.

References Cited by the Examiner

UNITED STATES PATENTS

| | | | |
|---|---|---|---|
| 2,623,853 | 12/1952 | Stross | 252—28 |
| 3,006,848 | 11/1961 | Caruso | 252—28 |

FOREIGN PATENTS

| | | |
|---|---|---|
| 534,711 | 12/1956 | Canada. |
| 560,130 | 7/1958 | Canada. |

DANIEL E. WYMAN, *Primary Examiner.*

I. VAUGHN, *Assistant Examiner.*